United States Patent
Liu et al.

(10) Patent No.: US 10,332,126 B2
(45) Date of Patent: Jun. 25, 2019

(54) METHOD AND APPARATUS FOR IN-VEHICLE CONSUMER INFORMATION GATHERING

(75) Inventors: Yimin Liu, Ann Arbor, MI (US); Perry Robinson MacNeille, Lathrup Village, MI (US); Joe Phillip Pierucci, West Bloomfield, MI (US); Oleg Yurievitch Gusikhin, West Bloomfield, MI (US); Erica Klampfl, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1402 days.

(21) Appl. No.: 13/362,014

(22) Filed: Jan. 31, 2012

(65) Prior Publication Data

US 2013/0197973 A1 Aug. 1, 2013

(51) Int. Cl.
*G06Q 30/02* (2012.01)

(52) U.S. Cl.
CPC .................................. *G06Q 30/02* (2013.01)

(58) Field of Classification Search
CPC .. G06Q 30/02; G06Q 30/0201; H04N 21/252; H04N 21/4222; H04N 21/44222
USPC ................................................ 705/7.11–7.42
See application file for complete search history.

(56) References Cited

U.S. PATENT DOCUMENTS

| | | | | |
|---|---|---|---|---|
| 2003/0220835 | A1* | 11/2003 | Barnes, Jr. | G06Q 10/1053 705/14.36 |
| 2004/0117246 | A1* | 6/2004 | Applebaum | G01C 21/26 705/14.5 |
| 2007/0226041 | A1* | 9/2007 | Oesterling et al. | 705/10 |
| 2008/0167958 | A1* | 7/2008 | Balaban | G06Q 30/02 705/14.64 |
| 2010/0241573 | A1* | 9/2010 | Joa et al. | 705/80 |
| 2011/0046968 | A1* | 2/2011 | Hawthorne et al. | 705/1.1 |

OTHER PUBLICATIONS

Bullo, F., E. Frazzoli, M. Pavone, K. Savla, and S. L. Smith. "Dynamic Vehicle Routing for Robotic Systems." Proceedings of the IEEE 99, No. 9 (Sep. 2011): 1482-1504. (Year: 2011).*
Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).

(Continued)

*Primary Examiner* — Amber A Misiaszek
(74) *Attorney, Agent, or Firm* — Frank Lollo; Brooks Kushman PC

(57) ABSTRACT

A computer implemented method includes receiving vehicle location information. The method also includes delivering a survey to one or more vehicle occupants, over a vehicle audio system, the survey related to a business having some correlation to the location information. Further, the method includes collecting survey results. Also, the method includes relaying the survey results to a remote server for processing. The method additionally includes providing a digital reward to the one or more occupants participating in the survey.

7 Claims, 3 Drawing Sheets

(56) References Cited

OTHER PUBLICATIONS

Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.

* cited by examiner

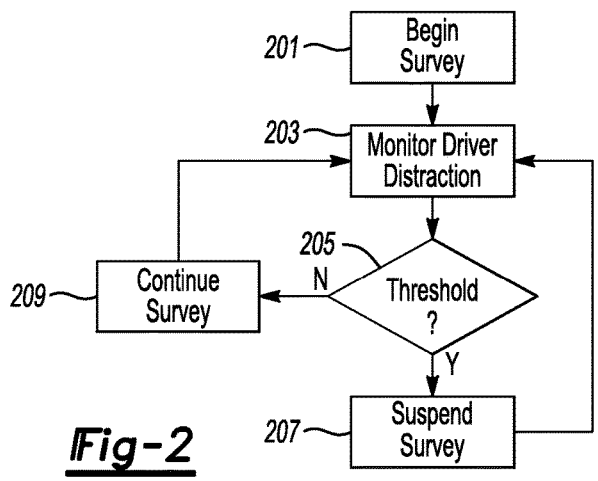
_Fig-2_
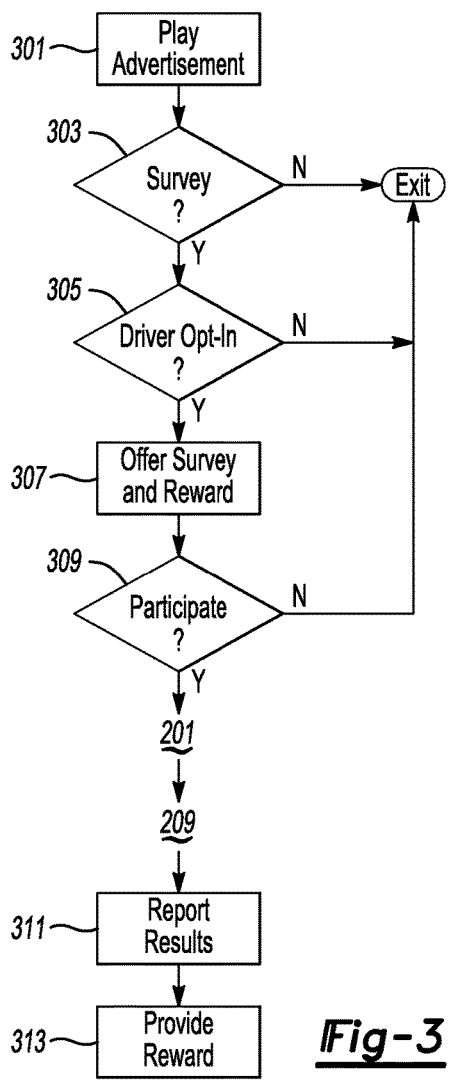
_Fig-3_
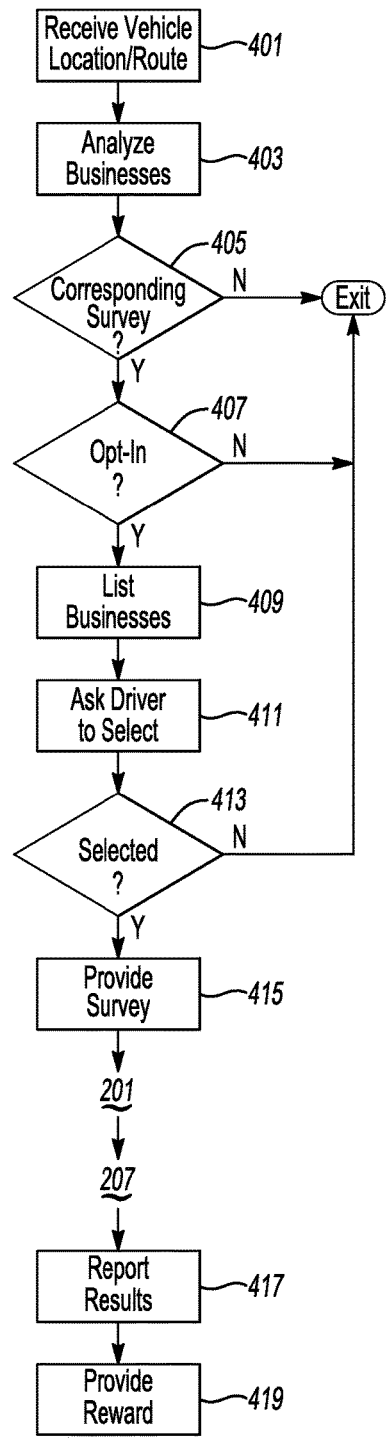
_Fig-4_

US 10,332,126 B2

METHOD AND APPARATUS FOR IN-VEHICLE CONSUMER INFORMATION GATHERING

TECHNICAL FIELD

The illustrative embodiments generally relate to methods and apparatuses for in-vehicle consumer information gathering.

BACKGROUND

Vehicle infotainment and information systems make the bi-directional transmission of information between a vehicle and a remote server a realistic possibility in many of the modern vehicles on the road. Internet feeds, live radio, songs, movies and other data can all be streamed to a vehicle in real time. Vehicle computing systems can use established internet connections to obtain data from remote sources, and to communicate vehicle-related data to those remote sources for inclusion in remote application processing.

Since an average driver may spend over an hour per day in their vehicle, the ability to obtain interesting content for vehicle delivery can help pass the time. In addition, navigation and vehicle system controls can be optimized using cloud based resources, to improve the driving experience.

Vehicle information and infotainment systems also have the ability to deliver custom advertisements/surveys to users based on known user preferences. The advertisements/surveys can relate to common shopping stops for a user, to local businesses, or to items the user has indicated or shown a previous preference for purchasing/considering.

SUMMARY

In a first illustrative embodiment, a computer implemented method includes receiving vehicle location information. The method also includes delivering a survey to one or more vehicle occupants, over a vehicle audio system, the survey related to a business having some correlation to the location information and also related to drivers' information. Further, the method includes collecting survey results.

Also, the illustrative method includes relaying the survey results to a remote server for processing. The illustrative method additionally includes providing a digital reward to the one or more occupants participating in the survey.

In a second illustrative embodiment, a computer implemented method includes receiving vehicle route information. The method further includes offering a survey to a vehicle occupant. Also, the method includes, upon election to complete a survey by an occupant, calculating an amount of time remaining in a vehicle route. The method additionally includes selecting a survey having an estimated taking time less than the amount of time remaining in the vehicle route or selecting a survey related to occupants' just finished-shopping experiences in the route. Further, the method includes delivering the selected survey to one or more vehicle occupants, over a vehicle audio system.

In a third illustrative embodiment, a computer implemented method includes detecting achievement of a vehicle metric condition. The method also includes providing a survey relating to a driver's satisfaction with some aspect of the vehicle. Further, the method includes collecting survey results. The method additionally includes delivering the survey results to a remote server for processing and providing a reward for completion of the survey.

BRIEF DESCRIPTION OF THE DRAWINGS

FIG. 2 shows an illustrative example of a survey initiation process;

FIG. 3 shows an illustrative example of a survey delivery process;

FIG. 4 shows an illustrative example of a survey selection process; and

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
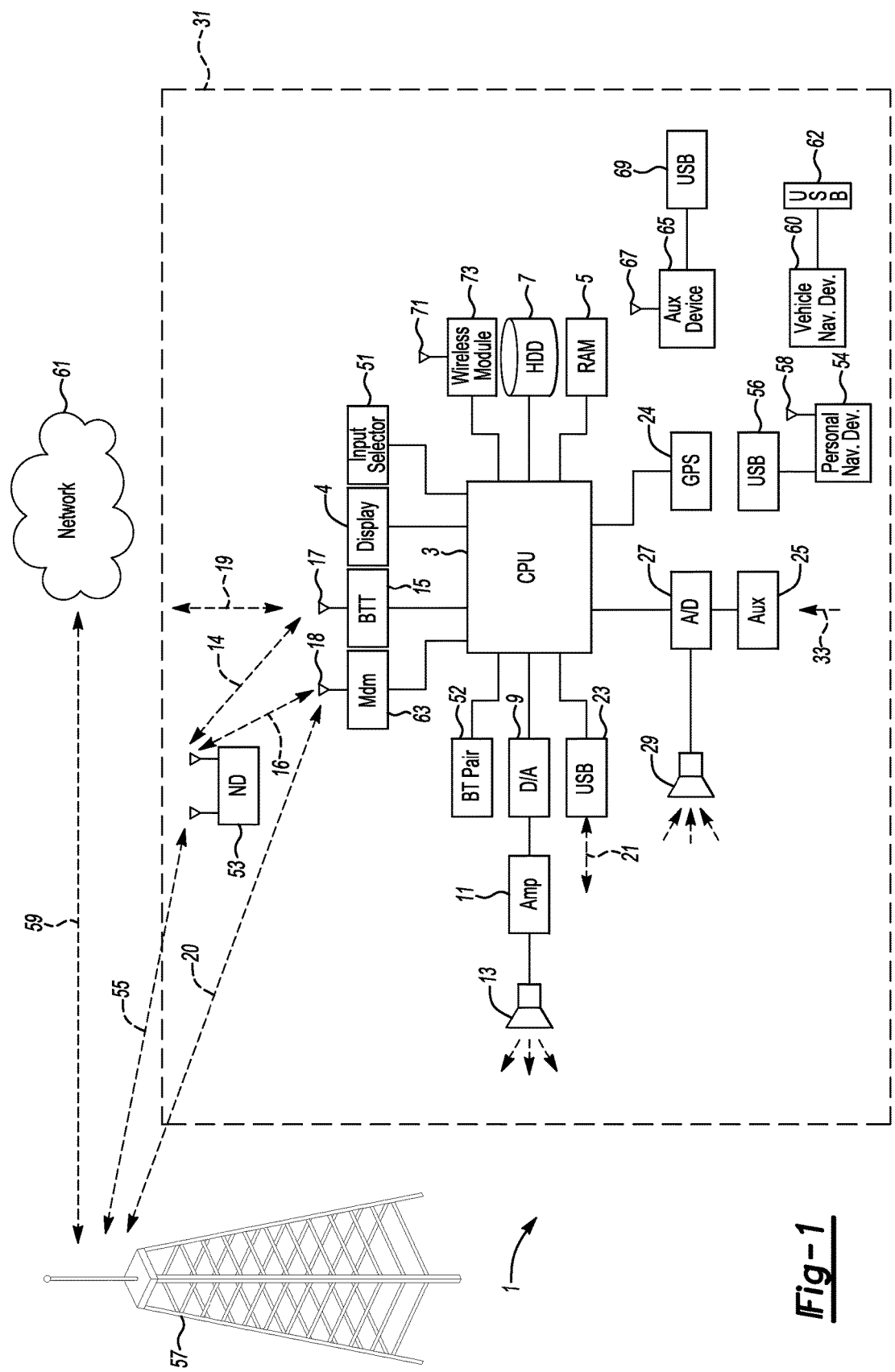
FIG. 1 shows an illustrative example of a vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11 g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (firewire), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the exemplary processes.

In addition to providing media and advertisements in accordance with user preferences, another opportunity exists to provide users with targeted marketing surveys. Since people often have a great deal of "spare" time while driving, driving time can be used to verbally respond to survey questions, so the surveys will have high finishing rate that paper surveys or on-line surveys. While it may be possible to take paper surveys or online surveys, in other circumstances, in the vehicle surveys can be related to a known vehicle occupant or even related to a business in proximity to the vehicle or drivers just experienced.

FIG. 2 shows an illustrative example of a survey initiation process. In this illustrative example, a survey is presented to the driver 201. The survey can be downloaded to the vehicle for completion and return to a remote system, or the survey can be processed, for example, one question at a time.

Because there is a possibility that a driver may need to focus on driving, the survey can be temporarily suspended, or even cancelled if needed. Although not shown, the driver could be given a physical or verbal control that allowed pausing or cancelling the survey or taking the survey later. Also, in this embodiment, the process itself checks ongoing driver distraction monitoring 203. Driver distraction monitoring can track, among other things, speed changes, steering wheel reversals, cellphone use, traffic patterns, erratic driving behavior and other indicators that a driver may need to focus more carefully on the road and that focusing on a survey may not be completely safe. Accordingly, if a driver distraction level is above a certain threshold 205 the process may suspend the survey 207 until a time when the distraction level has fallen to an acceptable point. Rather than asking the driver if they were distracted during the survey, this and other questions such as "what is your pulse rate" could be measured by SYNC and automatically returned with each answer on the survey.

Once the driver distraction level has fallen back below a certain point, or as long as it does not cross a threshold distraction level, the survey continues 209.

FIG. 3 shows an illustrative example of a survey delivery process. In this illustrative example, a driver may be able to take a survey associated with an advertisement, a product or company that has just run an advertisement played to the driver. A survey may also be associated with a navigation route segment for example, "how do you like our city", or, "are you bothered by the pollution", or "how did you like the McDonalds", or "was the service good at our gas station". The survey could provide, as a reward, a coupon or discount for the product, or some other incentive for the driver to take the survey. Since the driver will be listening to a multitude of advertisements while driving, this will allow marketers to focus on specific needs and wants of particular customers. Additionally, since the audience is a captive one, with little else to do other than drive to a destination, there should be a higher incidence of opting in to a survey.

For example, without limitation, a McDonald's advertisement advertising breakfast could be played. The driver could elect to take a brief survey following the advertisement, wherein the driver is asked questions relating to McDonald's breakfast preferences. The driver could then be given a digital coupon for McDonald's, and directed to the nearest McDonald's along a given route, where the coupon can be redeemed.

In the example shown in FIG. 3, the process first plays an advertisement for a product or company 301. In at least one instance, an advertisement has one or more surveys associated therewith. The survey could be a generic survey, relating generally to the product/company, or it could be a survey specifically about a given product or company, or the customer's reaction to the advertisement If there is a survey associated with the advertisement 303, the process checks to see if a driver has opted into surveys in general 305 and selects an appropriate survey for the vehicle occupant taking the survey based on occupant profile and advertiser preference. Surveys may be queued in a first in first out queue with event triggering. For example, if the surveyor wishes to do a survey on an ad an hour or a day after the vehicle occupant(s) heard the ad, this can be handled by queuing the ad while the occupants use the system for other purposes. Also, if the infotainment system is busy conducting a survey, and other surveys arrive they may be queued. Since some vehicle users may not wish to take surveys while driving, in this embodiment there is an opt-in provision wherein the vehicle user sets a system to allow delivery of some or all surveys. If the driver or another occupant has opted in and decided to receive surveys, the process will provide data relating to the survey, including, for example, without limitation, survey duration, a possible reward, etc. 307. Once the user has seen the possible reward, duration, etc., the user can elect whether or not to participate in the survey 309.

If the user elects to participate, the process will present the survey, as shown in exemplary, non-limiting fashion in FIG. 2. Once the survey has been completed or ended in a satisfactory manner, the process can then report the results 311 to a remote server for processing and delivery to appropriate end sources. The process can also delivery a reward to the driver 313, and results of the survey can be added to the driver's profile for screening future advertisements.

In one example, the reward may be an instantly redeemable coupon or credit towards a purchase or merchant. In other examples, the reward could be a credit to a user account, a vehicle related reward, the continuation or free play of downloaded media, etc.

For example, automotive companies such as FORD spend millions surveying customers on post-purchase satisfaction with vehicles. By implementing an embodiment of the present invention, an automotive manufacturer could know, for example, exactly when a vehicle had been driven for a month, for 10,000 miles, had been just purchased, etc. In each relevant instance, brief surveys about customer service experiences or quality satisfaction (things-go-wrong (TGW)) could be given to the driver. In exchange for responding, suitable reward could be provided (discount on dealer services, extra 1,000 miles on a warranty, extension of premium in-vehicle services, etc.).

In another example, streaming music services, such as PANDORA, provide real time streamed music to portable devices and in-vehicle audio systems. Advertising included with the music delivery is often used to offset the cost of providing the music. Instead of listening to advertisements, however, a user might instead wish to respond to a survey and receive some uninterrupted period of music in exchange for responding.

FIG. 4 shows an illustrative example of a survey selection process. In this illustrative example, the process for survey selection and delivery can choose surveys that may be situationally relevant for a particular user. For example, the user could be traveling to a specific business, or could be traveling past specific businesses, for which one or more surveys is available. In such a case, providing surveys about the destination or proximate businesses could both provide the user with a reminder to shop there and provide the user with a coupon that was immediately useful.

To make reward coupons resulting from surveys immediately usable, the coupon could be sent to a smart phone or other wireless device via email or text messaging. Then, when the user makes a purchase, the digital coupon could be scanned directly from the device and redeemed on the spot.

Figure 5:
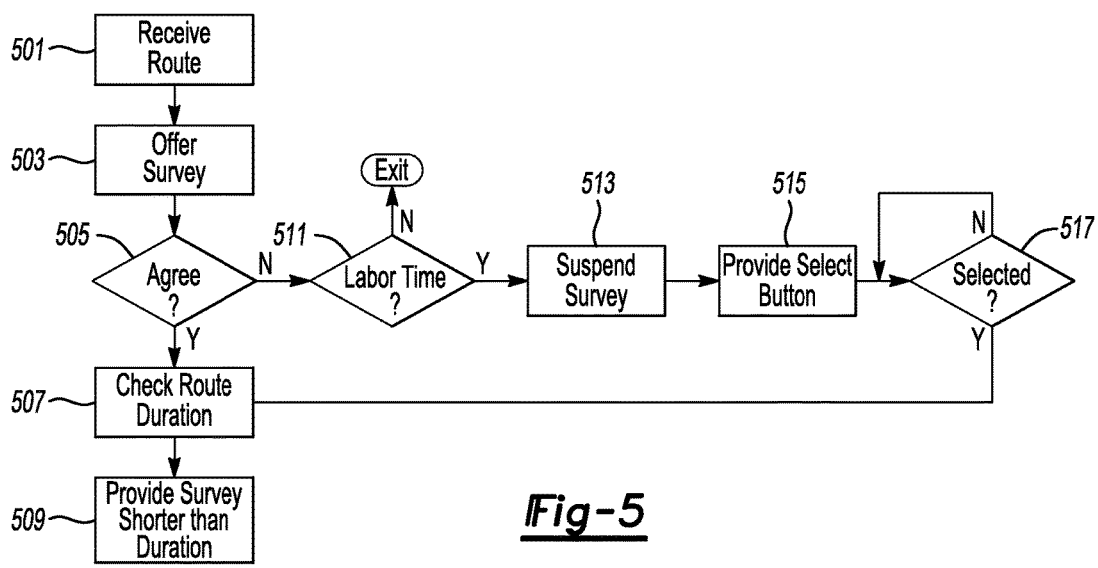
FIG. 5 shows a second illustrative example of a survey selection process.

FIG. 5 shows a second illustrative example of a survey selection process. In this non-limiting example, the process first receives a vehicle location, route, destination, etc. Generally, at least some data relating to the vehicle's geo-position is obtained 401. Once the appropriate data has been received, the data is analyzed to determine what businesses are proximate to a current location or along a route 403.

In one example, a destination address could be received and the process could determine (through address correlation), the particular business or businesses located at the destination. A user could even be presented with a list of possible businesses at the destination for which surveys and corresponding credits/discounts are available.

In another example, the process may examine businesses along a route, and present the user with a list of surveys available for businesses along the route. The business data could also be cross referenced with context data (time of day, weather, vehicle/driver needs, etc.) to determine if a particular survey would be advantageous for a particular driver. For example, a driver may have previously entered items of interest or responded to a particular survey in the past. If a store which the driver prefers, or which sells a desired item of interest is nearby a route or destination, the driver could be provided with a survey relating to that store, a reward coupon for the store, and directions to the store.

If there are any corresponding or relevant surveys, the process continues on to check if the driver or another occupant has opted in for survey participation 407. In this example, if the driver has opted in for survey participation, a list of recommended and/or relevant businesses is provided so a user can select a business/product for which a survey should be taken. In this example, only the businesses for which a survey exists are provided, so that the information on available surveys is apparent from viewing the list. In another example, all businesses could be provided, and repeated selection of a business for which a survey did not exist could be recorded and thus incentivize that business to utilize the survey providing option.

The driver is asked to select a particular survey that the driver would like to participate in completing 411. If no survey is selected 413 or the operation is cancelled, it is assumed that the driver does not want to complete any of the available surveys at that time. Otherwise, the driver is provided with a survey corresponding to the selected business/product 415. Once completed, the survey results are reported to a remote server 417 and any relevant reward is provided to the driver 419.

FIG. 5 shows a second illustrative example of a survey selection process. In this illustrative example, secondary considerations are taken into account when selecting a survey. The survey may still be route-dependent, or could just be a randomized survey or targeted survey to a specific consumer segment (e.g. luxury vehicle buyers). In addition to or alternatively to choosing a survey based on location of the vehicle, however, a survey selection could be limited based on an expected amount of time in a vehicle.

In this non-limiting example, the process receives a route plan from the vehicle 501. In accordance with a preselected/determined or random survey provision option, the process offers a survey to the vehicle occupant 503. If the user agrees to take the survey 505, the process proceeds to checking the estimated duration of the route 507. This could be based on the distance of the route, an estimated speed, weather conditions, traffic conditions, etc.

Once the remaining travel time has been estimated, a survey having less projected duration than the remaining travel time may be provided 509. For example, a survey may have an associated amount of time set as 15 minutes, meaning it is projected that the survey requires 15 minutes to complete. If there were fewer than 15 minutes estimated remaining in a route, this survey may be unsuitable for delivery, as it could be difficult to complete the survey in time. Or, occupants can also always save un-finished surveys for later.

If the user does not agree to taking a survey when asked 505, the process determines if the user would like to take a survey at a later time 511. For example, the user may be on a phone call or otherwise briefly distracted, and so the option to delay taking the survey could be provided. If the user elects to take a survey at a later time, the survey process could be suspended 513 until selected by the user 517. The user, for example, could be given a digital button 515 or verbal command usable to resume the survey.

Once the survey has been resumed, the process could select a survey of adequate but not excessive duration, again based on estimated travel time 507.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer implemented method comprising:
receiving vehicle destination input;
determining a business located at the destination;
selecting and delivering a survey, related to the business, to a vehicle occupant over a vehicle audio system while the user travels to the destination;
collecting survey results from the vehicle occupant using a vehicle-based input;
relaying the survey results to a remote server for processing; and
providing a digital reward to a participating occupant.

2. The method of claim 1, wherein the receiving further includes receiving driver demographic information, and wherein the selecting is further based at least in part on the demographic information.

3. The method of claim 1, wherein the destination includes GPS coordinates and the business located within a predefined distance of the GPS coordinates.

4. The method of claim 1, wherein the digital reward is an electronically transferred coupon.

5. The method of claim 1, wherein the digital reward is sent as a coupon embedded in a text message.

6. The method of claim 1, wherein the selecting further comprises selecting a survey having an associated projected completion time of less than an estimated time remaining to the destination.

7. The method of claim 1, wherein the selecting further comprises selecting a plurality of surveys and wherein the delivering further comprises:
presenting a selectable list of the plurality of surveys on a vehicle interface;
and delivering a selected one of the plurality of surveys over the vehicle audio system.

* * * * *